United States Patent [19]

Newcomb

[11] Patent Number: 5,553,387
[45] Date of Patent: Sep. 10, 1996

[54] AIRCRAFT HOLDING PATTERN WIND COMPENSATOR

[76] Inventor: John H. Newcomb, 545 Wistar Rd., K-22, Fairless Hills, Pa. 19030

[21] Appl. No.: 424,187

[22] Filed: Apr. 19, 1995

[51] Int. Cl.[6] ............................................. G01C 21/20
[52] U.S. Cl. ........................ 33/1 SD; 33/431; 235/78 N
[58] Field of Search .............................. 33/1 SD, 1 SB, 33/431; 235/61 NV, 78 N, 61 B, 77, 78 R

[56] References Cited

U.S. PATENT DOCUMENTS

| | | | |
|---|---|---|---|
| 3,110,965 | 11/1963 | Kittock | 33/1 SD |
| 3,654,436 | 4/1972 | Sansom, Jr. | 235/61 NV |
| 4,274,204 | 6/1981 | Self | 33/1 SD |
| 5,214,855 | 6/1993 | Gibbs | 33/1 SD |

*Primary Examiner*—Christopher W. Fulton

[57] ABSTRACT

A navigational computer for correcting for wind drift effect experienced while flying an aircraft's holding pattern, and for properly orienting any holding situation at both station and intersection fixes using only the standard-procedure holding instructions issued by Air Traffic Control. The device is comprised of three rotatable discs, one of which has a semi-circular extension with a magnetic variation scale on it. Orienting the pattern is a two-step process utilizing only two discs. A "Direction of Hold" pointer allows the pilot to first set the general direction of hold as specified by Air Traffic Control, then to "fine-tune" the orientation by setting either the direction of hold pointer or the reciprocal Inbound Course pointer (whichever is then closer) to the specified holding radial. The system automatically allows for the differences between station and intersection holds. The wind corrections are ultimately expressed as inbound and outbound headings to fly and outbound elapsed time. They are arrived at by selecting the holding true airspeed and category number from a wind speed table, orienting the pattern, orienting the wind, choosing the appropriate-category number-set from an angular sector closest to the center of the window, correctly applying the given or interpolated inbound and outbound corrections to addition and subtraction heading correction scales, and then reading the inbound and outbound headings-to-fly from an adjacent compass dial. The inbound heading is flown for about 1 minute; the outbound, for the prescribed or interpolated time.

4 Claims, 5 Drawing Sheets

Table 1 (87, 90):

| CATEGORY | | | | | WIND SPEED |
|---|---|---|---|---|---|
| 1 | 2 | 3 | 4 | 5 | |
| 55 | 40 | | | | 6 |
| 64 | 47 | | | | 7 |
| 73 | 53 | 40 | | | 8 |
| 82 | 60 | 45 | | | 9 |
| 91 | 67 | 50 | | | 10 |
| 100 | 73 | 55 | 41 | | 11 |
| 109 | 80 | 60 | 44 | | 12 |
| 118 | 87 | 65 | 48 | | 13 |
| 127 | 93 | 70 | 52 | 40 | 14 |
| 136 | 100 | 75 | 56 | 43 | 15 |
| 145 | 107 | 80 | 59 | 46 | 16 |
| 155 | 113 | 85 | 63 | 49 | 17 |
| 164 | 120 | 90 | 67 | 51 | 18 |
| 173 | 127 | 95 | 70 | 54 | 19 |
| 182 | 133 | 100 | 74 | 57 | 20 |
| 191 | 140 | 105 | 78 | 60 | 21 |
| 200 | 147 | 110 | 81 | 63 | 22 |
| 209 | 153 | 115 | 85 | 66 | 23 |

Table 2 (86):

| WIND SPEED | CATEGORY | | | | |
|---|---|---|---|---|---|
| | 2 | 3 | 4 | 5 | 6 |
| 24 | 160 | 120 | 89 | 69 | 56 |
| 25 | 167 | 125 | 93 | 71 | 58 |
| 26 | 173 | 130 | 96 | 74 | 60 |
| 27 | 180 | 135 | 100 | 77 | 63 |
| 28 | 187 | 140 | 104 | 80 | 65 |
| 29 | 193 | 145 | 107 | 83 | 67 |
| 30 | 200 | 150 | 111 | 86 | 70 |
| 31 | 207 | 155 | 115 | 89 | 72 |
| 32 | 213 | 160 | 119 | 91 | 74 |
| 33 | 220 | 165 | 122 | 94 | 77 |
| 34 | | 170 | 126 | 97 | 79 |
| 35 | | 175 | 130 | 100 | 81 |
| 36 | | 180 | 133 | 103 | 84 |
| 37 | | 185 | 137 | 106 | 86 |
| 38 | | 190 | 141 | 109 | 88 |
| 39 | | 195 | 144 | 111 | 91 |
| 40 | | 200 | 148 | 114 | 93 |
| 41 | | 205 | 152 | 117 | 95 |

Table 3 (88, 89):

| WIND SPEED | CATEGORY | | | |
|---|---|---|---|---|
| | 4 | 5 | 6 | 7 |
| 42 | 156 | 120 | 98 | 84 |
| 43 | 159 | 123 | 100 | 86 |
| 44 | 163 | 126 | 102 | 88 |
| 45 | 167 | 129 | 105 | 90 |
| 46 | 170 | 131 | 107 | 92 |
| 47 | 174 | 134 | 109 | 94 |
| 48 | 178 | 137 | 112 | 96 |
| 49 | 181 | 140 | 114 | 98 |
| 50 | 185 | 143 | 116 | 100 |
| 51 | 189 | 146 | 119 | 102 |
| 52 | 193 | 149 | 121 | 104 |
| 53 | 196 | 151 | 123 | 106 |
| 54 | 200 | 154 | 126 | 108 |
| 55 | | 157 | 128 | 110 |
| 56 | | 160 | 130 | 112 |
| 57 | | 163 | 133 | 114 |
| 58 | | 166 | 135 | 116 |
| 59 | | 169 | 137 | 118 |
| 60 | | 171 | 140 | 120 |
| 61 | | 174 | 142 | 122 |
| 62 | | 177 | 144 | 124 |
| 63 | | 180 | 147 | 126 |
| 64 | | 183 | 149 | 128 |
| 65 | | 186 | 151 | 130 |
| 66 | | 189 | 154 | 132 |
| 67 | | | 156 | 134 |
| 68 | | | 158 | 136 |
| 69 | | | 160 | 138 |

FIG. 9

AIRCRAFT HOLDING PATTERN WIND COMPENSATOR

BACKGROUND OF THE INVENTION

1. Field of the Invention

This invention relates to the wind drift problems facing an instrument pilot who attempts to execute a holding pattern at a radio fix. The device is intended to provide the best available holding pattern wind drift correction for virtually any situation that might be encountered by a wide range of aircraft.

2. Description of the Prior Art

Figure 3:
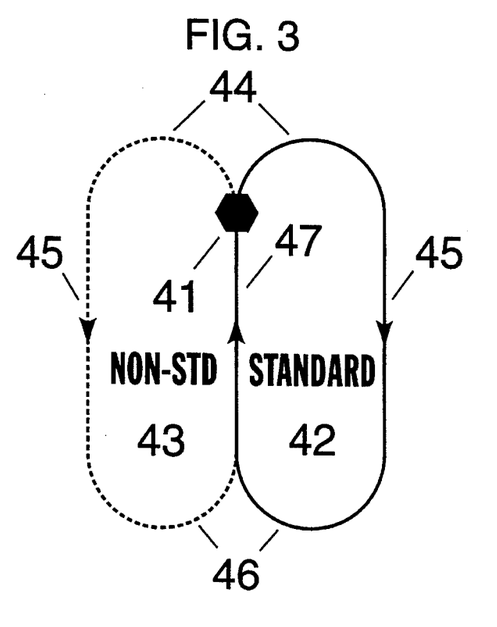
FIG. 3 shows the ideal shapes for both right- and left-hand holding patterns in a no-wind situation with all pertinent parts marked.

An aircraft on an instrument flight plan, due to localized traffic congestion, may be required by Air Traffic Control (ATC) to establish an oval-racetrack-type holding pattern at a given ground-based radio fix 41 (see FIG. 3). These instructions are normally given a few minutes before the aircraft reaches the designated fix, allowing the pilot ample time to determine the proper entry to the pattern as depicted in the Federal Aviation Administration's (FAA) Airman's Information Manual (AIM). When the pilot reaches the fix, he or she is expected to execute 1 of 3 different types of entries (based on the aircraft's heading on entry relative to the holding pattern) to attempt to intercept the inbound (IB) leg approximately 1 minute's flight from the station or fix. Upon crossing the fix again, he is expected to execute a standard 42 (right turns) or non-standard 43 (left turns) holding pattern, as instructed by ATC, and to adjust subsequent holding patterns according to previous errors caused by the wind.

When crossing the fix without having been given clearance beyond that fix, the pilot should begin the outbound (OB) turn 44, or in other words, the turn to the OB leg 45. The pattern turns are expected to be flown at a standard turn rate of 3° per second (2 minutes for a full 360° turn) which can be determined by timing across 30° of turn or by using a turn coordinator, a required instrument for flight under instrument flight rules (IFR). Without wind, the pilot, upon reaching the reciprocal (i.e., opposite direction) of the IB leg, would roll out of the turn and hold that direction for 1 minute. With no wind correction needed, the IB turn 46 would bring the plane back onto the IB leg 47 with a minute left to reach the fix again. The IB leg is always defined by a radial from a ground-based V.O.R. station, a final approach radio "beam" originating from what's called a localizer, or when using an Automatic Direction Finder in conjunction with a ground-based Non-Directional Beacon, a magnetic bearing from the station. The fix is always defined as the radio station itself or as an intersection of 2 radials (or magnetic bearings) originating from 2 different stations.

A course is the track or line that an aircraft follows in relation to the ground or surface of the earth. A heading is the direction an aircraft flies through the airmass, and when the airmass is moving, unless the plane is pointed directly upwind or downwind, the heading and the course will differ by what's called the wind correction angle (WCA), or conversely, the drift angle.

The FAA currently specifies a trial-and-error method for correcting subsequent holding patterns for wind drift effect. Whenever a WCA is necessary to track (fly over a straight ground path by pointing or "crabbing" the plane as necessary into the wind) on the IB leg, that correction should be doubled on the OB leg to help compensate for the 2 uncorrected turns in the pattern. Regarding timing, they view the 1-minute IB leg 47 as the "parking space" in the sky, and it is up to the pilot to adjust his OB timing and direction so that the IB leg comes as close as possible to the 1-minute target. The FAA suggests that the first pattern after crossing the fix be flown with a 1-minute OB leg, then the IB leg be timed to find the error, or the time off 1 minute. The rule for adjustment is as follows: with an IB leg tailwind, double the IB time error and add it to the OB time used on the previous OB leg. With a headwind on the IB leg, take ½ the IB leg time error and subtract it from the OB leg. These crude corrections often simply help keep the pilot in the general area, and when the wind is strong, it may take 4 or 5 circuits or more for the pilot to get close to rolling out on the IB leg. Intercepting the IB leg while a minute's flight time away from the fix can even be impossible, while using the trial-and-error method. For example, when the wind speed rises to about 35% or more of the aircraft's holding speed, a direct headwind on the IB leg would require flying straight past or beyond the fix for some time to avoid the next circuit's IB leg from taking well over a minute. This is due to the wind shortening the IB leg distance traveled in 1 minute as well as 2 minutes of wind drift that the FAA doesn't allow the pilot to correct for while turning. Although it might be viewed as extending the IB leg past the fix, the additional distance added past the fix would be referred to, by the FAA and in this application, as the OB leg, since the OB leg's primary purpose is to adjust the IB leg to its ideal orientation and timing, and since the plane is actually tracking OB from the fix. The said 180° correction leg cannot be derived from the trial-and-error method's "formula", nor can any correction leg whose OB angular correction is more than twice the IB correction. This is where the pilot must use his own judgment, and even a mathematical genius would have difficulty estimating the corrections to any reasonable degree of accuracy, let alone while flying the plane.

Up until now, the trial-and-error method has been the only method available for holding pattern wind compensation. There are some devices that are intended to help the pilot visualize holding pattern entries, but they have nothing to do with wind correction. Most of the devices used for any type of wind correction are related to correcting for a single-direction track along the ground, like that which a pilot needs when flying from point A to point B in a moving airmass. Examples include the well-known Dalton E-6B for solving wind triangle problems and simplified versions like that shown in U.S. Pat. No. 4,134,006 in which the "computer" is designed to work for only 1 specific airspeed for the purpose of making things simpler for the pilot of a given aircraft. There are also handheld calculators available that solve for wind triangles. However, the only use any of these would have for a pilot executing holding patterns would be to correct for the wind drift encountered on the IB leg only.

Until now, wind effect on a curved path through space has eluded all devices except the most elaborate and expensive Electronic Flight Instrument System (EFIS). I've seen this capability demonstrated only once (on TV) by an experimental EFIS, and I don't know if it made it into production.

Even this said EFIS would have definite limitations where holding patterns are concerned. To the best of my knowledge, it will make a groundtrack projection on a cathode-ray-tube display as to where the aircraft will go if the selected turn rate is held for a specified period of time, and the wind remains constant. It does this for only 1 turn at a time, and cannot be used to forecast the wind effect on a holding pattern's 2 turns separated by an OB leg. It would help a pilot capture the IB leg from the OB side by projecting the effects of adjusting his rate of turn, if he were to guess at a reasonable correction beforehand, but it would not tell him how to time his OB leg, or even what heading to fly on the OB leg. Getting reasonable corrections would still rely heavily on trial-and-error.

SUMMARY OF THE INVENTION

In view of the current limitations in the prior art, mentioned above, the principal objective of this invention is, therefore, to provide the angular corrections and timing required on the OB leg of the holding pattern, for virtually any wind direction and velocity, so that the pilot, within reasonable tolerances, will be able to turn directly onto the IB leg on his first full-circuit pattern with close to a 1-minute travel time left to reach the fix.

Another objective of the device is to help the instrument pilot remain mentally oriented to the aircraft's heading and approximate position in the pattern, to magnetic north, and to the wind's effect on the pilot's groundtrack by graphically showing the direction the wind is from.

Another objective of the device is to reduce a pilot's delay in knowing the "full-circuit" completion time so that he will be able to report the next "arrival-at-the-fix" time earlier and more accurately to ATC. As a side effect, this could reduce the total time spent in holding when, for instance, the controller is confident that the holding aircraft will fit into traffic flow with minimum spacing requirements. At the very least, it will afford the pilot more time to study his approach plates, next route segment, procedures, etc., while established in holding.

A further objective of the device is to provide a means for the pilot to avoid venturing into (i.e., violating) unprotected airspace, thus reducing both the pilot's and the controller's workloads when the pilot does not have to be notified of his position.

Another objective of the device is to make it easier for an instrument pilot to initially set up (i.e., orient) his holding situation.

Other objectives of the invention, together with its use and capabilities, will be better understood when the following descriptions are read while referring to the drawings.

DESCRIPTION OF THE DRAWINGS

FIG. 2 does line up with FIG. 1, and they share the same scale.

DETAILED DESCRIPTION OF THE PREFERRED EMBODIMENT

Figure 1:
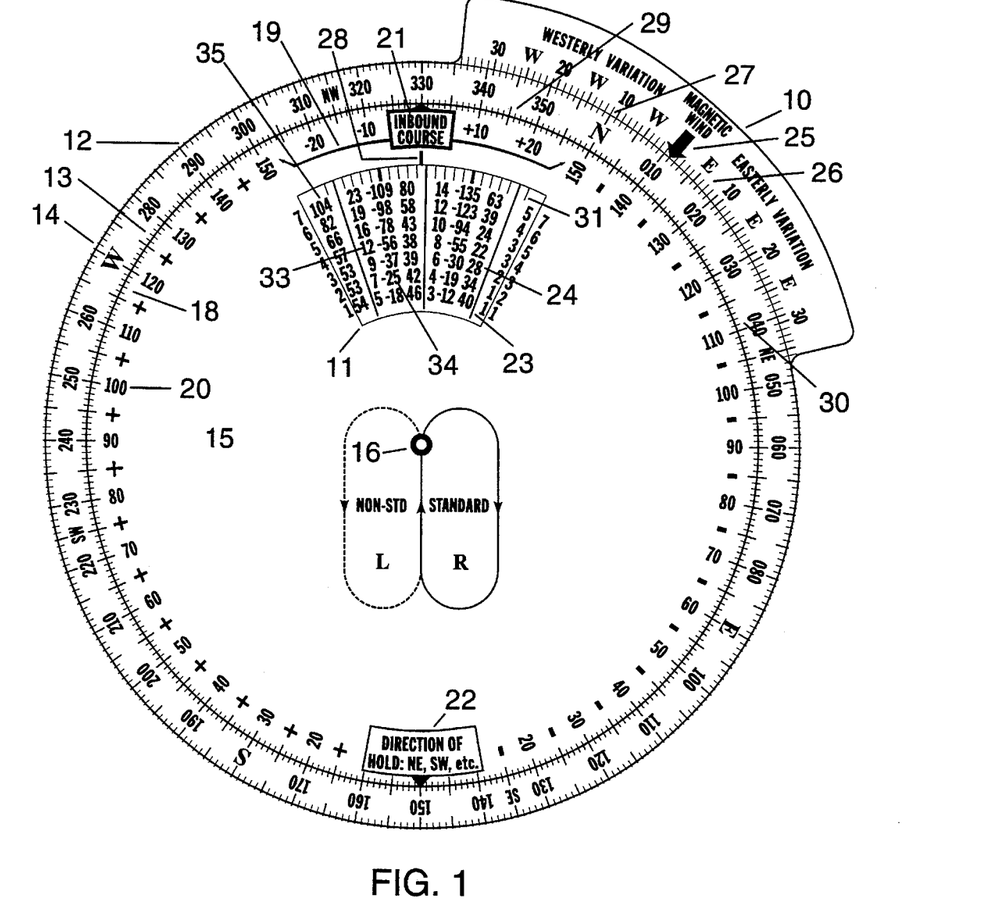
FIG. 1 is a plan view of the holding pattern wind compensator showing the preferred embodiment of the invention.
Figure 2:
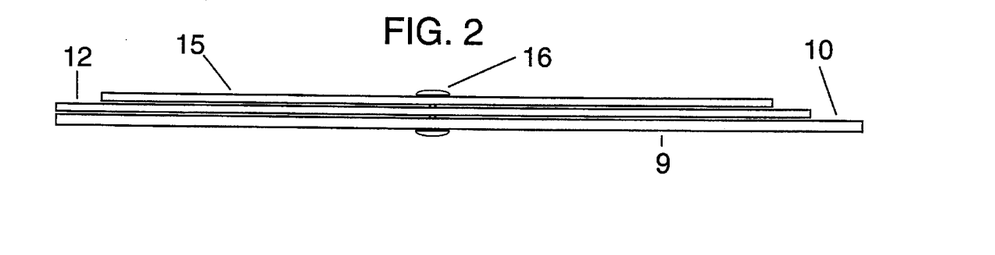
FIG. 2 is a cross-sectional view of the computer.

Referring now to FIGS. 1 & 2, the invention is composed of a base disc 9 (see also FIG. 8), this being the third disc, with an approximately 70° wide extension 10 that protrudes beyond the disc's normal diameter. The extension is graduated over a 70° range, and it is intended to indicate the direction the wind is from, corrected for magnetic variation. The base disc also has number sets printed on it that show through the window 11. The second disc 12 simply has a compass rose with 2 sets of indicia scales, the inner compass scale 13 and the outer compass scale 14, that are both graduated through 360°. The second disc is transparent between the same radii that define the window on the first disc 15 which is attached to the other 2 discs by means of an eyelet 16, and all 3 discs are free to rotate in relation to each other around their circle centers or central points which all line up at 16.

Both left and right no-wind holding patterns are depicted on the first disc. Sharing a common side, which is the IB leg of both patterns, they show the shape of the standard and non-standard holding patterns that would result from flying the patterns correctly in a no-wind situation (see also FIG. 3). The eyelet 16 that holds the discs together can represent the holding fix, station, or intersection that the pilot has been instructed to hold at.

The first disc has a heading correction scale 18, also called a holding pattern correction scale, graduated in 360 1-degree increments. This scale is divided into 2 separate ranges, with an almost 60° span 19 devoted to the IB corrections, and the remainder devoted to the OB corrections. These scales could be arranged in many different ways, including overlap, but the arrangement shown is designed to make the vast majority of possible corrections easier to see or mark. The numbers 20, with accompanying plus/minus signs, are included to help the pilot locate the corrected OB or IB heading without mental arithmetic. The IB and OB heading correction scales both originate at the IB 21 and no-wind OB 22 course markers. The IB course marker shows the desired course to be flown IB to the fix, and the OB marker shows the unadjusted OB course that would be used when the wind is calm. The no-wind OB course marker says, and actually indicates, the "Direction of Hold", as given by ATC in the holding instructions, to make it easier for the pilot to initially orient the holding pattern.

Figure 9:
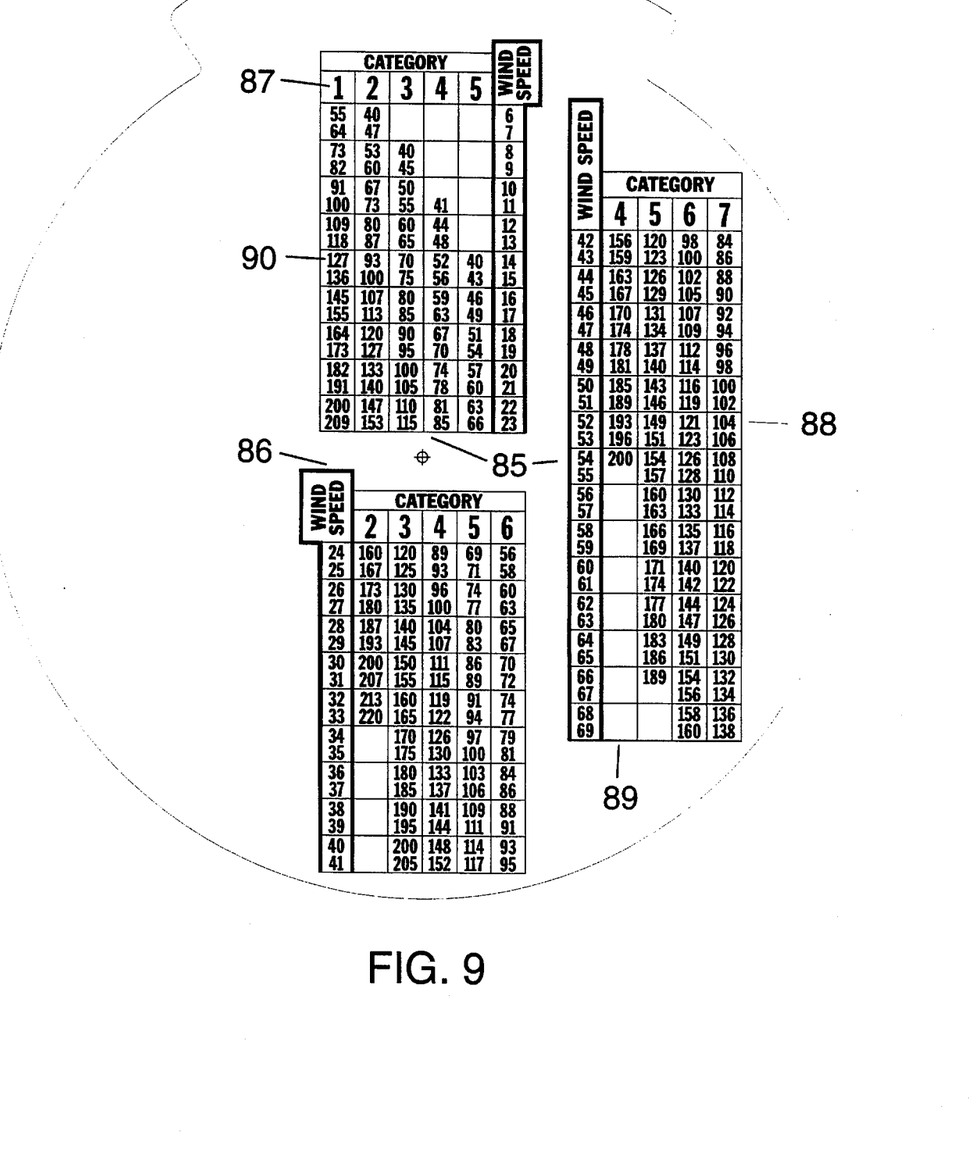
FIG. 9 shows the reverse side of the base disc with available holding true airspeeds displayed in relation to a range of wind speeds.

The table 85 on the reverse side of the third disc (see FIG. 9) is designed to let the pilot choose his holding airspeed in relation to the speed of the existing wind. In FIG. 9, the wind speed 86 is given in 1-knot increments in the columns on the extreme sides of the table. Upon locating the wind speed in the table, the user can then trace directly across until he finds a suitable holding speed for his aircraft. The pilot must then note which category 87, indicated at the top of each column 89 the holding true airspeed is in. The categories are expressed in whole numbers and in a given category, each wind speed is a set percentage of each associated true airspeed 90 that's shown. For example, in category 7, each wind speed is exactly half of the associated true airspeed, and the percentage base is 50%. The category is also used to determine which row 24 of number-sets (FIG. 1) should be used to adjust the holding pattern for the wind. A change in percentage bases would still use the same principle, but the novelty here is the use of a wind-speed-versus-airspeed common percentage base that makes a given holding pattern correction number-set usable for many possible speed combinations.

The number-sets 33 that show through the window each contain 3 numbers: the IB angular correction, the OB angular correction, and the OB leg time in seconds, respectively. In the illustrations, each number set section is separated from the next section by a divider 23 that extends radially outward from the center of the base disc. Each section contains 3 columns of numbers, each column 35 contains a specific holding pattern correction (e.g., the OB leg time) for each percentage-based category and extends radially from the center of the base disc, and the numbers are read or disposed circularly in rows 24 across the columns. Each section has a specific angular orientation to a wind direction pointer 25 printed on the extension 10 of the base disc, that also has a magnetic variation scale 26 printed on it that originates at the wind direction pointer with easterly variation on 1 side and westerly on the other. When the true (geographic) wind direction given by, say, an FAA Flight Service Station (FSS) is read against the local magnetic variation found on aerial charts, the wind pointer 25 indicates the direction the wind is from in relation to magnetic north, which is the orientation used for all instrument flying.

It is also possible to arrange the window with all numbers (inside and around the window) rotated 90° to allow the window to be placed on the left or right of the first disc rather than at the top or bottom. The numbers would then read radially in columns across the window, each column containing a specific correction, e.g., the OB leg time, for each category, with each number-set stacked in a circular row, with 7 or so circular rows and 3 correction columns in each section. However, since it is possible to locate the window anywhere around a circle on the first disc by simply reorienting the data, the arrangement of the data, not its orientation, is a primary focus of this patent application.

Figure 8:
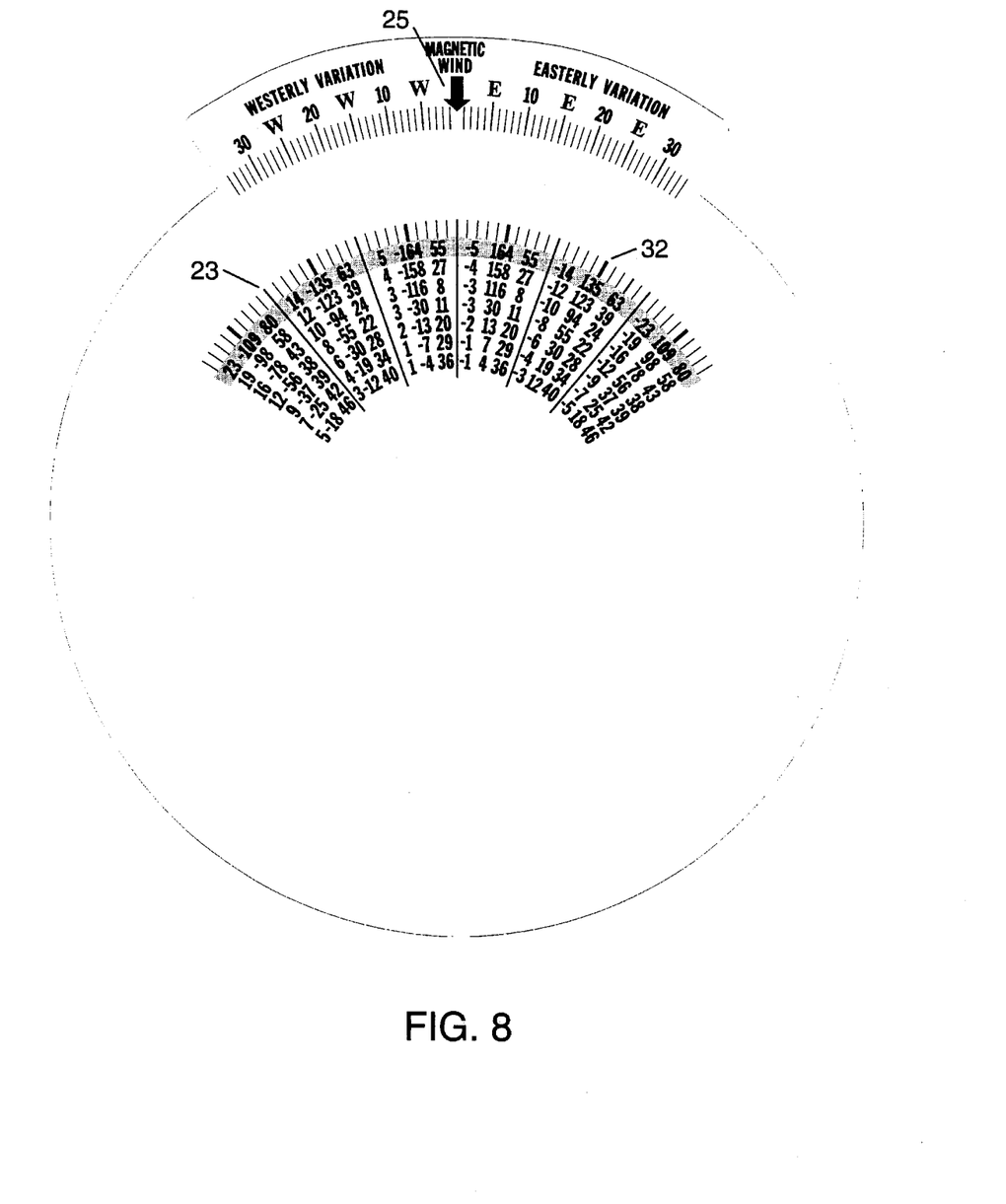
FIG. 8 displays the base disc separately.

The said number-set sections are equal sections and each contributes to a full circle. In FIG. 8, they are printed every 20° around the full circle, and at the midpoint lines 32 that lie halfway between each section divider 23 they present exact solutions. 20° was selected due to the physical size limitations of the device and the necessary readability of the numbers, but it is also possible, though not necessarily practical, to dispose equal sections every 10°, 12°, 15°, 18°, 24°, or 30°. Anything larger than 30° would make interpolated solutions too inexact, and smaller than 10° would be unreadable without doubling the overall size of the device. These considerations are not part of what is patentable, but I mention them to perhaps help the reader to better understand the device, and to discourage potential plagiarists by reminding them that they will not be able to sidestep the patent claims simply by changing the positioning or number of the sections, or by changing the positioning of the window on the first disc.

FIG. 8 makes it evident that exact-solution number-sets are given for each 20° change in wind direction, with the wind pointer lining up directly with one of the section dividers. It is also possible to have an alignment where the wind pointer is positioned exactly halfway between 2 adjacent dividers. However, since the angular corrections generally change in value more rapidly near the wind line than they do near the crosswind line, positioning the solution sets so that the first number sets are centered on lines 10° to either side of the wind pointer makes the trends easier to recognize. Also possible, but less practical, would be to orient the sections to the pointer on a sectional spacing that is other than wholly or halfway across the pointer 25 (or to use unequal sections) and this is mentioned for the reasons stated in the previous paragraph.

It should be noted here that while this device greatly improves upon the prior art, the solutions it provides are generally not exact. The problem is too complex for the use of any known linear, logarithmic, or trigonometric graphic/ numeric/indicia solution display system. It is commonly known that 4 dimensions cannot be represented on a 2-dimensional surface. This problem is similar. It involves 2 special dimensions and a time dimension with 2 velocity vectors, 1 of which, the aircraft vector, is constantly changing direction in the turns, and both it and the wind vector must span a wide range of velocities to be useful. The trends produced by a complex computer program have thus far frustrated all attempts at using a graphic/pointer/indicia system, and I believe that the number-set system used is not only mandated, but also is unique to this application.

A device that generates approximate solutions sets no precedent, of course, as demonstrated by U.S. Pat. Nos. 2,901,167 and 4,134,006, to name 2. On these devices, solutions are given for each 10° change in wind direction, and solutions that do not line indicia up perfectly require either slight adjustment, or in the latter's case, interpolation between adjacent values. On my device, the number-sets are rended, but not required, to be interpolated when the holding pattern falls between the 20° exact-solution increments. The angular corrections given are translated into headings to fly not by means of a mental process (an easy mental process is needed only if the pilot wishes to visually interpolate the number sets before using the heading correction scales), but by means of the said heading correction scales. All the pilot must do to get a solution once the dials are set is identify the correct uninterpolated solution set (which would be the one in an appropriate category row in the section that is the centermost section 34 in the window) and apply the given angular corrections to the IB correction scale 19 and the OB correction scale 18 which, when read against the inner compass scale 13, will show which OB leg compass heading should be flown in a straight line (for the time period specified by the third number in each set) to make the IB leg as close to ideal (on the specified radial for 1 minute's duration) as possible. The final solutions are, admittedly, close approximations, but they will, almost invariably, be a vast improvement over the prior art because of their accuracy and their ease of availability.

For those who will opt for interpolation, the window is designed to facillitate visualization of in-between solutions by means of a marker scale. A center marker 28 at the top of the window is used in conjunction with a "tenths" scale 31 printed on the base disc in each number-set section to help the pilot see how far between 2 exact solutions his solution is. Again, the trends are not linear, but the interpolated solution set will, in most cases, still be more accurate than using the exact-solution number-sets. Whichever method the pilot selects, he will be in far better shape than using the prior art, which, e.g., occasionally sees pilots overshooting the radio fix before completing the turn to the IB leg, and angular displacements of more than 45° or more off the IB leg are not uncommon when holding at a station. Even with wind forecast errors, and without using interpolation, I have yet to see an IB leg angular displacement exceeding 15° or an IB leg time error of more than 20 seconds while using my device. The average has been within about 5° and 10 seconds in strong winds, and "bull's eyes" are not uncommon. This is a world of difference to a pilot on instruments. Those who have held in strong IB leg tailwinds will tell you that even the proper IB leg correction can be difficult to figure during any entry that approaches the fix on a course other than the IB leg course, due to the difficulty in "getting established" on the IB leg for any appreciable interval prior to fix passage. If you are unable to get an accurate IB WCA, the OB correction becomes even more difficult to guess. This invention virtually eliminates the guesswork.

OPERATION OF THE INVENTION

While the results of using this device are worlds apart from the prior art, in actual flight, the disciplines differ little, with the main exception being that slightly more attention must be paid to selecting the airspeed to be flown around the pattern. The prior art, as described in the AIM, specifies no particular airspeed, only that a comfortable, fuel-efficient speed should be maintained in holding. With this device, true airspeed must be maintained at a specific value, within reasonable margins, a practice that any instrument pilot is well-acquainted with. Most of today's aircraft are delivered with true airspeed conversion dials on their airspeed indicators, but should a pilot find himself in an aircraft without a true airspeed dial, he can still easily convert indicated to true on a "standard-issue" E-6B flight computer, or on an electronic flight computer.

Another exception in flight operation, in addition to the obvious lack of trial-and-error work required, is that the timing on the OB leg, with this device, begins when the plane is rolled back to level flight on the adjusted OB heading. In the prior art, "wings-level"as it's called, is used only when one is unable to determine his abeam point, or the point at which the plane crosses a line 90° off the IB course that originates at the station, and is said to be abeam the station. Until now, "wings-level" has been used mainly for intersection holding where the abeam point may be undeterminable. Wings-level is the easier of the 2 methods.

Some other reasons why flight operations are generally easier with this device include not having to draw the holding situation out on paper, which is all but demanded by the prior art for any unpublished hold. Also, having the pattern visually oriented to a compass rose (corpass card) helps a pilot keep his bearings better than having to revisualize the alignment every time one looks at the aircraft's directional gyro (DG). This also makes it easier to determine what type of entry pattern the pilot should fly. Other helpful points, including knowing the full-circuit round-trip time and, consequently, being able to predict a reasonably-accurate ETA at the fix much earlier, shall become obvious during a "walk-through" of using the device.

Figure 7:
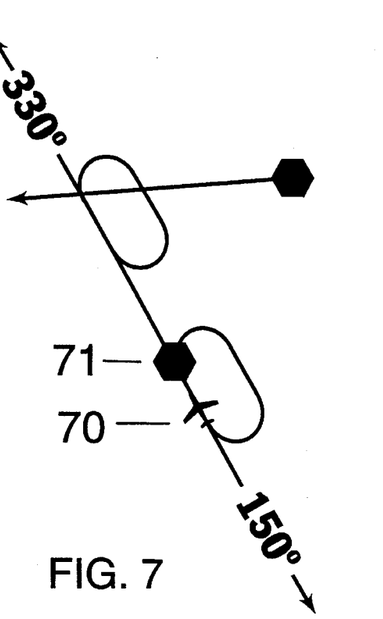
FIG. 7 shows 1 example of how holding at an intersection of 2 "radials" from 2 separate stations can differ from holding at a station.

The example problem given here is a situation similar to one the inventor personally encountered. Suppose that ATC gives the following instructions to the pilot: "Upon reaching the Longwait VOR, you are to hold southeast of the station on the 150° radial, standard turns." Let's say that the plane is already flying a magnetic course of 330° inbound to the VOR station on the 150° radial (which radiates outward from the VOR). The airplane 70 will approach the fix 71 as indicated in FIG. 7. A "direct" entry will be used, as specified in the AIM, which means that the pilot will enter the holding pattern using a "normal" holding pattern to intercept the IB leg. The alternatives are called teardrop and parallel entries and are used when approaching the pattern from certain other zones. The pilot has already received the winds aloft forecast from a brief call to flight service, and the wind at his altitude is reported from 360° at 52 knots.

The first step is to orient the holding pattern. The "direction of hold" is always given by ATC using one of eight cardinal compass directions, and "hold southeast" means that the main body of the holding pattern will be toward the southeast side of the fix. FIG. 7 shows how holding at a station can differ from holding at an intersection. In both cases, the direction of hold would be given as southeast since the majority of the pattern is toward the southeast side of the fix. However, in the intersection example, since the plane, while on the IB leg of the pattern, is tracking the 330° radial outbound from the station (yet IB to the intersection), the holding radial would be specified by ATC as the 330° radial, not the reciprocal 150° radial as in the station example. All other things being equal, if the intersection were on the 150° radial on the opposite side of the station, then the station holding radial would be the same as the intersection holding radial. In other words, whenever the IB leg takes the plane away from the station defining the IB leg, the specified direction of hold will be in the general reciprocal direction of the given holding radial. Remembering these facts quickly can be difficult, however.

To facilitate orientation during set-up, this device uses a "Direction of Hold" pointer that is first set in the general direction specified by ATC in the holding instructions. In the problem, when the pointer is directed toward southeast, the pilot would recognize that the specified 150° radial is closer to the "Direction of Hold" pointer than to the "IB course" pointer, and he would reset it on the 150° index. If the reverse were true (as in FIG. 7), then the pilot would reset the holding direction pointer by setting the IB course pointer on the specified holding radial. This system works for any type of hold.

Even this seemingly simple set-up system differs from the prior art. The system has not previously been used on any type of holding pattern device. Both the Jeppesen and ASA companies manufacture 2 nearly identical holding pattern devices whose sole purpose is to help the pilot visualize the proper entry into the holding pattern. In both cases, the pilot, once given his holding instructions by ATC, must first decide what the no-wind OB course would be so he can set that number in the OB course window. When the direction of hold is generally opposite the given holding radial (as in FIG. 7), these devices do nothing to help the pilot decide which no-wind OB course to set. In these cases, the pilot must remember to set the reciprocal of the given holding radial in the OB course window, especially since this is not mentioned on the devices. Also, the compass azimuths used on both devices are based on aircraft heading inbound to the fix, and thus all the headings in the azimuth are reciprocals of a normal compass radial orientation to the fix (relative to the data displayed in the OB course window), and cannot be used for any other purpose than determining the type of entry. These devices can be misleading for this reason, and are not as readily understood as the system used on my device.

Because holding patterns have been in their present form since 1963, and because, in that time no one else has simplified the set-up and orientation on a device to the degree that I have, I believe that this "Direction of Hold" system may also be patentable, and I will address it in the claims.

The next step is to orient the wind. Winds aloft are always given in relation to true north (the geographic north pole) and must be converted to magnetic north. The local magnetic variation found on aerial charts (the angular difference between true and magnetic north, is given as 12° West. The pilot's adage "East is least and West is best" means that when changing from a true orientation to a magnetic one, easterly variation is subtracted and westerly variation is added, so that when you're pointed at 348° true, your compass will indicate north and true north is 12° to your right. This device compensates for variation "automatically". In the example problem, the variation of 11° west is found on the variation scale 26 and placed over the 360° index (the true wind direction) on the outer compass scale 14. Lining up as shown at 27, the wind is now oriented to magnetic north, and in this case, it's from 011°.

Next, the pilot must select his holding airspeed. To do this, the wind speed of 52 knots is found in the wind column (see FIG. 9), and the pilot follows directly across that row 88 to see what airspeeds are available. For example, if he is flying a Piper Arrow, his holding speed range is from about 80 to 140 knots, and 2 airspeeds are available: 121 knots in Category 6, and 104 knots in CAT 7. Note that pilots don't normally fly on instruments in winds that are ½ of their cruise speed, for several reasons, and CAT 7 should be used only when the winds encountered are higher than forecast, since there is more potential for drift caused by wind error. In other words, it is seen mainly as a backup, it should not be used for flight planning, and the column will be indicated thusly on production versions. The high wind distortion problem I personally encountered was not forecast, and the surface wind was only 20 knots or so. The wind at 3000 feet above ground level was almost 10 knots higher than expected, thus the reason for the backup.

Once the category has been selected, the next step is to refer to the window 11. Since the solution lies almost halfway between 2 full number sets, interpolation between the 2 number sets is recommended. Again, you could use a set from the centermost section, in this case 19 –98 58, and the results would be acceptable, with only minor adjustments needed to intercept the IB leg. However, interpolation does provide better accuracy. The 2 IB leg angular corrections shown are +19° and +12°. The position of the interpolation marker 28 along the interpolation scale 31 suggests that the best IB leg angular correction to use would be slightly closer to +19° than to +12°, or about +16°. When marked at 29, this would dictate an IB heading of 346° to be used on the IB leg. Visually interpolating the OB correction between –98° and –123° would lean toward –111°, which when marked at 30, would make the OB heading 39°. 58 and 39 interpolate to about 49 seconds, and this is how long the OB heading would be held before beginning the turn back to the IB leg.

Figures 4, 6:
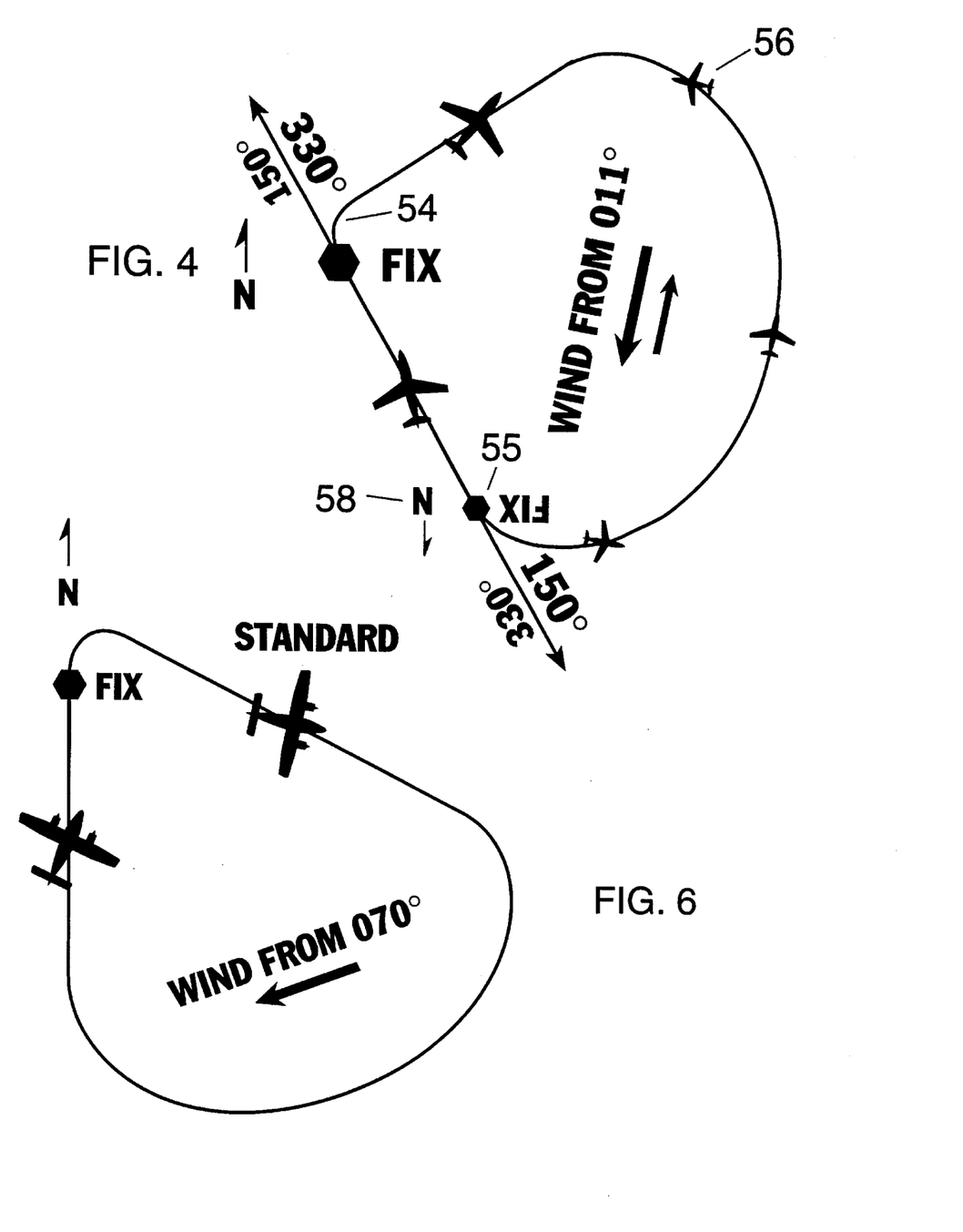
FIGS. 4, 5, & 6 show 3 different plan views of holding pattern ground tracks that result when a holding pattern is corrected properly using the device's category 6.

FIG. 4 shows the approximate groundtrack that results from using these corrections. In order to execute the proper pattern, the pilot must cross the fix as closely as possible, and start the OB turn 54 from the corrected IB leg compass heading, in this case 346°. Immediately upon crossing the fix, he would roll into a standard-rate-turn using his turn coordinator, and hold that turn rate until rolling out on the corrected OB compass heading of 39°. After 49 seconds have elapsed, the IB turn is started and held until reaching the IB heading again. Upon rollout, the plane will reach the fix in about 1 minute at its 77 knot groundspeed.

A non-standard or left-hand pattern would have exactly the same corrections as the right-hand pattern, but the shapes of the OB and IB turns will switch sides of the pattern. To illustrate, view any of the pattern plan views upsidedown. The fix is moved to the opposite end 55 of the IB leg, and in FIG. 4 you will see that the OB heading is now reached with more than 180° of turn, as shown by the smaller airplane 56. The left-hand pattern wind is in the opposite direction of the right-hand pattern wind, but since North 58 is now also in the opposite direction, the wind is still seen as from 011° magnetic. The OB turn is far longer than the right-hand OB turn, but again, the OB heading remains the same. All the pilot has to remember is to stop his turn on that corrected OB heading, and the length of turn will take care of itself.

In some situations, the OB correction is close to twice the IB, as the FAA's rule-of-thumb would dictate. This works out only with a predominately tailwind component on the IB leg, or in the lightest winds. When the wind is more nearly crosswind, the ratio is more often near 3 to 1, and when you're close to having a headwind on the IB leg, the ratio can be as high as 40 to 1 or more. But even in the tailwind scenarios, the timing is virtually impossible to guess on the first circuit without the aid of this device.

Figure 5:
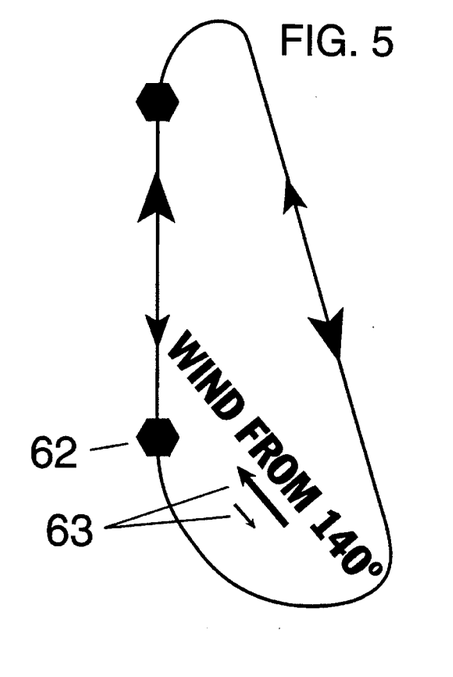

FIG. 5 shows a situation where the wind is close to being a tailwind on the IB leg. Again, the smaller fix 62, smaller planes, arrows and North pointer are for the left-hand pattern, which must be viewed upsidedown. The wind arrows 63 point in the direction the wind is going, but the direction given (140°) would be the direction the wind is reported from as in all weather reports.

FIG. 6 shows another wind direction, and the IB leg of the pattern is pointed toward magnetic north, for the sake of simplicity. The pattern would have the same shape regardless of which direction the IB course is pointed as long as the wind direction relative to the IB course is 070°. In other words, holding the first and the third discs in position, the second disc could be rotated to any position and the pattern would not change, but it and the wind would be oriented differently to magnetic north. Also, in a given category with a given wind direction, the pattern shape will be the same regardless of which speeds the pilot is using. The difference is that the shape will expand with higher speeds. To view the left-hand pattern with a 290° relative wind, visually "flip" the right-hand 070° wind pattern over to the left, rotating it around the IB leg, while leaving the fix in the same position. Note that FIGS. 5 & 6 do not contain all the documentation of FIG. 4 on like ideas.

I believe that this invention, along with its use and advantages, should be understood without further description. It should also be understood that this device will not, other than in the exception, make less than 2 holding true airspeeds available to the pilot of virtually any general aviation aircraft, as well as some transport-category aircraft. The addition of any further capacity in this area gained by spacing the categories closer together, percentage-wise, shall not be viewed as outside the scope of the forthcoming claims, nor shall changing the length of the IB leg to, e.g., 1½ minutes (currently used above 14,000 feet above mean sea level), nor shall renaming the categories as, e.g., A, B, C, etc., or as their actual percentage bases (e.g., 11%, 15%, 21%, etc.).

The claims that follow are not intended to be limited to foreseeable physical embodiments of the design (although several are mentioned), since there are many possible embodiments, probably too numerous to list. Basically, what I'm trying to patent is a simplified, non-electronic, organized, close-approximation solution process to correct for the wind drift effect on an aircraft's holding pattern. It is a distinct process, as outlined in the Operation section of this application, and the process is as much a part of the device's physical layout as the layout is part of the process. The transfer of information to the pilot is an implied part of the claims, and any other device that utilizes the same elements of organization in the solution process, regardless of the order in which they're presented or used, would be considered an infringement. An example of what would not be an infringement would be a graphic/pointer/indicia system that does not use number sets to arrive at a solution.

I claim:

1. An aircraft navigational aid for compensating for the drift effects of a moving body of air on an aircraft's holding pattern, comprising a plurality of discs concentrically mounted and free to rotate in relation to each other around their circle centers or central points, the first of said discs having addition and subtraction holding pattern correction scales graduated along its circumference reading against a graduated inner compass scale on a second disc, said correction scales indicating outbound leg and inbound leg compass headings to be flown when said scales are read against said second disc's inner compass scale using outbound leg and inbound leg angular corrections given by a user-identified number-set of a display printed on the third or base disc in angular sections with each said section having 3 number columns extending radially from the center of the base disc with said number-sets read circularly across the columns in numerous rows, each said section bearing specific orientation to a wind direction pointer on said base disc read against a graduated outer compass scale on said second disc, said wind direction pointer itself centered on a magnetic variation scale on said base disc read against the true wind direction to be located by the user on said outer compass scale on said second disc, also, each said number-set on said base disc having a third number representing the outbound leg time to be flown, and when said third and said first discs are oriented to said compass scales on said second disc, several number-set sections show through a window on said first disc, allowing an appropriate number-set from the centermost section appearing in said window to be used in conjunction with and in relation to an appropriate and corresponding wind speed and aircraft speed combination selected from a table printed on said navigational device with a common percentage base or common categorical identification heading each table column and identifying each window number-set row for the purpose of allowing the user to identify the correct number-set in relation to said wind speed and aircraft speed combination, said window also having a marker centrally printed on top of the window reading against a marker scale graduated in tenths between like markers printed radially at the top center of each number-set section on said third disc and visible in said window so that with any orientation of the 3 discs where said markers do not align perfectly, and thus the number-sets shown do not present an exact solution, said markers will facilitate optional visual interpolation between like numbers of 2 appropriate number-sets of common categorical identification in adjacent sections, allowing, in most cases, more accurate approximations to be applied to said holding pattern correction scales, and to the outbound timing, than would be available from using said number-sets in the centermost section alone.

2. The navigational aid of claim 1, with said first disc also having a pointer indicating the general direction of hold located on the circumference of said first disc in a position where one skilled in the art would normally expect a "No-wind Outbound Course" pointer to be located, the purpose of said holding direction pointer being to first orient the holding pattern to the compass scales or compass card printed on said second disc, according to the general direction of hold specified by Air Traffic Control, then said pointer being, in some examples, reset on the specified holding radial or magnetic bearing from a station also given by Air Traffic Control, or, in other examples, said pointer being reset by setting its reciprocal inbound course pointer, also printed on said first disc, on said holding radial or magnetic bearing, the 2 different types of reset depending upon which pointer is closer to said holding radial or magnetic bearing once the general direction of hold has been set first.

3. An aircraft navigational aid for compensating for the wind drift effects of a moving body of air on an aircraft's holding pattern, comprising a plurality of discs concentrically mounted and free to rotate in relation to each other around their circle centers or central points, the first of said discs having addition and subtraction holding pattern correction scales graduated along its circumference reading against a graduated inner compass scale on a third or base disc, said correction scales indicating inbound leg and outbound leg compass headings to be flown when said scales are read against said base disc's inner compass scale using inbound leg and outbound leg angular corrections given by a user-identified number-set of a display printed on the second disc in angular sections with each said section having several number columns extending radially from the center of the second disc with said number-sets read circularly across the columns in numerous rows, each said section bearing specific orientation to a wind direction pointer on said second disc read against a graduated outer compass scale on said base disc, said wind direction pointer itself centered on a magnetic variation scale on said second disc read against the true wind direction to be located by the user on said outer compass scale on said base disc, said second disc being transparent where it overlies any portion of said base disc, allowing the compass card on said base disc to show through said second disc, also, each said number-set on said second disc having a third number representing the outbound leg time to be flown, and when said second and said first discs are oriented to said compass scales on said base disc, several number-set sections show through a window on said first disc, allowing an appropriate number-set from the centermost section appearing in said window to be used in conjunction with and in relation to an appropriate and corresponding wind speed and aircraft speed combination selected from a table printed on said navigational device with a common percentage base or common categorical identification heading each table column and identifying each window number-set row for the purpose of allowing the user to identify the correct number-set in relation to said wind speed and aircraft speed combination, said window also having a marker centrally printed on top of the window reading against a marker scale graduated in tenths between like markers printed radially at the top center of each number-set section on said second disc and visible in said window so that with any orientation of the three discs where said markers do not align perfectly, and thus the number-sets shown do not present an exact solution, said markers will facilitate optional visual interpolation between like numbers of 2 appropriate number-sets of common categorical identification in adjacent sections, allowing, in most cases, more accurate approximations to be applied to said holding pattern correction scales, and to the outbound timing, than would be available from using said number-sets in the centermost section alone.

4. The navigational aid of claim 3, with said first disc also having a pointer indicating the general direction of hold located on the circumference of said first disc in a position where one skilled in the art would normally expect a "No-wind Outbound Course" pointer to be located, the purpose of said holding direction pointer being to first orient the holding pattern to the compass scales or compass card printed on said base disc, according to the general direction of hold specified by Air Traffic Control, then said pointer being, in some examples, reset on the specified holding radial or magnetic bearing from a station also given by Air Traffic Control, or, in other examples, said pointer being reset by setting its reciprocal inbound course pointer, also printed on said first disc, on said holding radial or magnetic bearing, the two different types of reset depending upon which pointer is closer to said holding radial or magnetic bearing once the general direction of hold has been set first.

* * * * *